United States Patent [19]

Skinner

[11] Patent Number: 5,007,628

[45] Date of Patent: Apr. 16, 1991

[54] APPARATUS FOR SENSING SHEETS

[75] Inventor: John A. Skinner, Hampshire, England

[73] Assignee: De La Rue Systems, Ltd., United Kingdom

[21] Appl. No.: 358,202

[22] Filed: May 26, 1989

[30] Foreign Application Priority Data

May 31, 1988 [GB] United Kingdom ............... 8812893

[51] Int. Cl.$^5$ ............................................. B65H 7/02
[52] U.S. Cl. .................................... 271/263; 271/110
[58] Field of Search ................ 271/263, 110, 111, 272

[56] References Cited

U.S. PATENT DOCUMENTS

| | | | |
|---|---|---|---|
| 4,068,385 | 1/1978 | Mitzel . | |
| 4,420,747 | 12/1983 | Kistner | 271/263 X |
| 4,506,880 | 3/1985 | Dixon | 271/263 |
| 4,527,793 | 7/1985 | Bottcher | 271/263 |
| 4,560,159 | 12/1985 | Staub | 271/263 |
| 4,700,368 | 10/1987 | Munn | 271/263 X |

FOREIGN PATENT DOCUMENTS 0186442 12/1985 European Pat. Off. .
2106081 9/1982 United Kingdom .
82/01698 5/1982 World Int. Prop. O. .

Primary Examiner—Richard A. Schacher
Attorney, Agent, or Firm—Ostrolenk, Faber, Gerb & Soffen

[57] ABSTRACT

Apparatus for sensing the passage of sheets (1) through a nip formed by rollers (5 and 6), includes a core (14), moving with the shaft of one of the rollers, and a flat coil (15) connected to an oscillator circuit for sensing the deflection of one roller relative to the other. The oscillator circuit (18) provides a train of signals the frequency of which varies with the amount of the relative deflection of the rollers, and a counter (19) counts the signals from the oscillator in a fixed time interval. A store (22) stores counts representing the relative deflections of the rollers in a cycle of movement of the rollers when no sheet is present. The difference between a subsequent count and a stored count for a corresponding position in the cycle of rotation of the rollers is compared with a predetermined threshold, to establish the presence or absence of a sheet between the rollers.

9 Claims, 6 Drawing Sheets

APPARATUS FOR SENSING SHEETS

FIELD OF THE INVENTION

This invention concerns apparatus for sensing the passage of sheets through a nip between a pair of guide rollers by sensing the relative deflection of the guide rollers during the passage of a sheet through the nip.

DESCRIPTION OF THE PRIOR ART

One example of such apparatus is shown in WO-A-82/01698. In this example, a sheet passes under a roller which is connected to a linear variable differential transformer. A signal representing the change of signal from the sensor in response to the passage of an expected thickness of a sheet is preset and to this is added a signal representing the datum value obtained from the sensor when the roller rests on a guide surface. When a note passes through the nip, the output signal is fed to a comparator, which also receives the expected thickness signal and the datum value, the comparator determining whether or not a sheet is present. Between the passage of successive sheets through the nip, the datum value is rechecked and a suitable correction is made if necessary.

Such an arrangement works well if the rollers and the shafts on which they are mounted are made with high mechanical precision but it is expensive to achieve such precision. The problem which arises when the roller and shaft system is not of high mechanical precision is that the "noise" level of the sensor output is comparable to the signal level corresponding to the passage of a single note, particularly for the thinner currencies.

In EP application No. 85309261.7 we describe apparatus for sensing the passage of sheets through a nip, comprising:

a pair of guide members whose surfaces define the nip, the guide members being movable in a cyclic manner to advance the sheets through the nip;

sensing means for sensing the deflection of one guide member relative to the other, the sensing means includes a signal generator providing a train of signals the frequency of which varies with the amount of relative deflection of the guide members, and a counter arranged to count the signals from the signal generator in an interval of predetermined length; and detecting means responsive to the output of the sensing means to establish the presence or absence of a sheet between the guide members.

In this earlier case, we describe sensing means including a solenoid and a core so mounted that relative displacement of the guide members by the passage of a sheet caused relative movement of the core and solenoid. We have found that a core with an internal diameter of about 10 mm is generally satisfactory but is not large enough to cater for the worst case mechanical tolerances. We have found, however, that although increasing the coil diameter has the benefit of improving the linearity in response, it significantly reduces gain to the point where the solenoid/core is insensitive to the type of movements which are to be sensed.

SUMMARY OF THE INVENTION

In accordance with one aspect of the present invention, apparatus for sensing the passage of sheets through a nip comprises a pair of guide members whose surfaces define the nip, the guide members being movable in a cyclic manner to advance the sheets through the nip;

sensing means for sensing the deflection of one guide member relative to the other, the sensing means including a signal generator providing a train of signals the frequency of which varies with the amount of relative deflection of the guide members, and a counter arranged to count the signals from the signal generator in an interval of predetermined length;

and detecting means responsive to the output of the sensing means to establish the presence or absence of a sheet between the guide members, and is characterised in that the sensing means includes a substantially flat coil and a core so mounted that relative displacement of the guide members by the passage of a sheet causes relative movement of the core and coil, and in that the coil is connected to the signal generator and controls the frequency of the signal generator in accordance with the degree of penetration of the core through the coil.

In accordance with a second aspect of the present invention, apparatus for sensing the passage of sheets through a nip comprises a pair of guide members whose surfaces define the nip, the guide members being movable in a cyclic manner to advance the sheets through the nip;

sensing means for sensing the deflection of one guide member relative to the other, the sensing means including a signal generator providing a train of signals the frequency of which varies with the amount of relative deflection of the guide members, and a counter arranged to count the signals from the signal generator in an interval of predetermined length;

monitoring means for monitoring the output of the sensing means and for storing counts representing relative deflections of the guide members in a cycle of movement of the guide members when no sheet is present;

and detecting means responsive to the output of the sensing means to establish the presence or absence of a sheet between the guide members, the detecting means being responsive to a subsequent count from the sensing means and to the stored counts for comparing, with a predetermined threshold, the difference between the subsequent count and a stored count for a corresponding position in the cycle of movement of the guide members, to establish the presence or absence of a sheet between the guide members and is characterised in that the sensing means includes a substantially flat coil and a core so mounted that relative displacement of the guide members by the passage of a sheet causes relative movement of the core and coil, and in that the coil is connected to the signal generator and controls the frequency of the signal generator in accordance with the degree of penetration of the core through the coil.

We have found that by using a substantially flat or planar coil, the gain is similar to the solenoid implementation while surprisingly there is only a small and acceptable loss in linearity allowing the coil to be fabricated simply on a printed circuit board.

Preferably, the detecting means includes means defining a second and higher threshold; a difference which lies between the two thresholds indicates the presence of a single sheet in the nip and a difference which exceeds the second and higher threshold indicates the presence of superimposed sheets in the nip.

Such apparatus reduces the required mechanical precision, so that the components are less expensive and the apparatus is simpler to construct and more reliable. The frequency-based system, in which each count effectively averages amplitude variations over a short, defined period, is less susceptible to spurious noise than a similar amplitude-based system.

Electrical and mechanical drift can be compensated in the microprocessor arrangements.

Conveniently, the apparatus includes a printed circuit board which carries the flat coil and other components of the detecting means.

In one arrangement, the sensing means comprises a pair of axially aligned flat coils which, where a printed circuit board is provided, are mounted on opposite sides of the board.

In the preferred form, the frequency of the signal from the signal generator and the counter capacity are such that the counter in effect overflows. In other words, the high-order data bits are ignored and the changes in the low-order bits are used in the signal processing. The use of a high frequency signal and overflow enhances the linearity of the system, so that it is no longer essential to employ a "linear transformer" as a sensor.

BRIEF DESCRIPTION OF THE DRAWINGS

In order that the invention may be better understood, an example of apparatus embodying the invention will now be described and contrasted with known apparatus with reference to the accompanying drawings, in which.

DETAILED DESCRIPTION OF THE DRAWINGS

Figure 1:
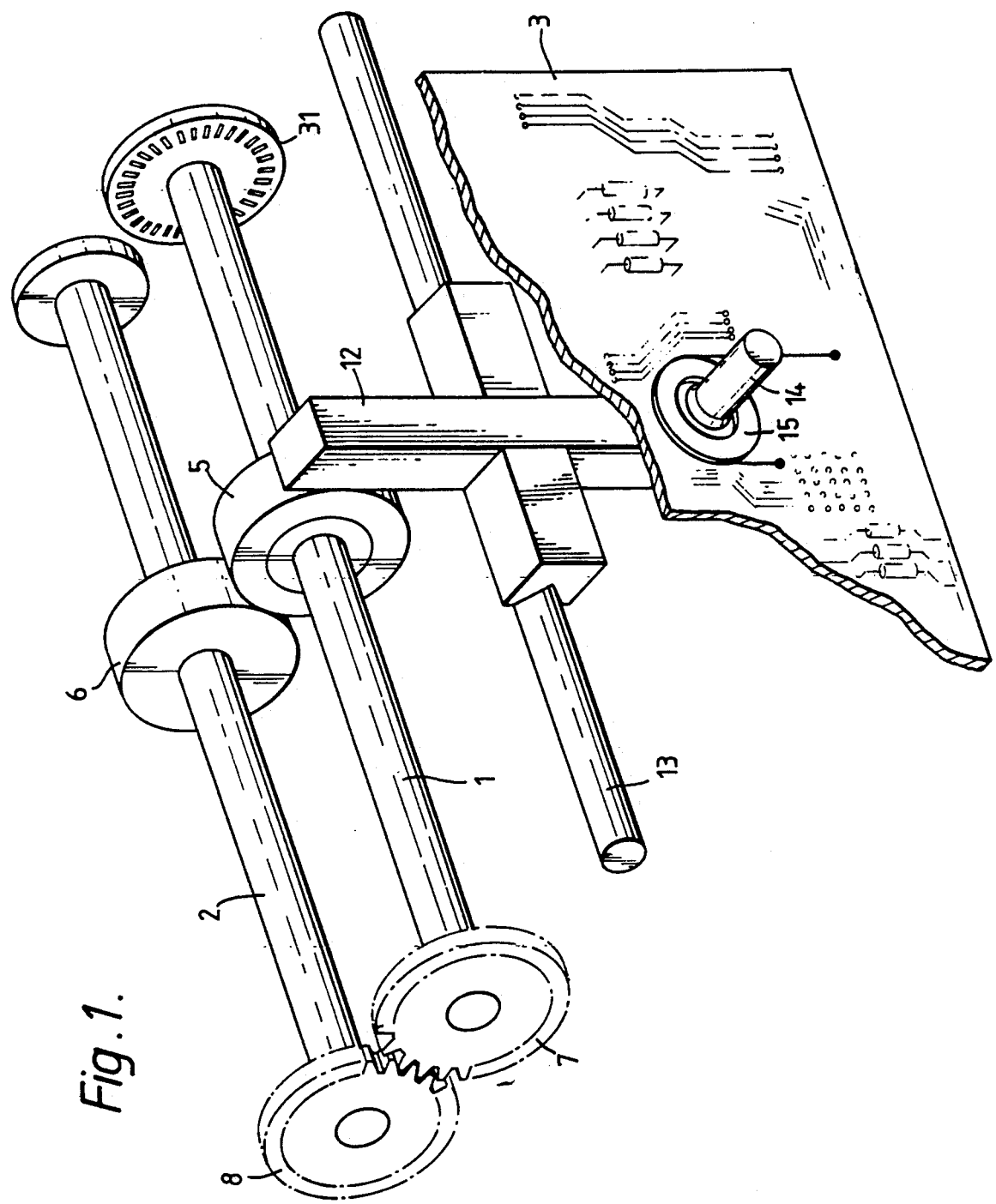
FIG. 1 is a schematic perspective and partly cut away view of the sheet feeding apparatus and sheet sensor.

The sheet feeding apparatus shown in FIG. 1 is for feeding banknotes and comprises two parallel shafts 1 and 2 mounted between side plates (not shown). The shaft 1 is the sensor shaft and carries a rubber filled roller 5 and the shaft 2 is the datum shaft and carries a solid roller 6. The rollers 5 and 6 are freely mounted for rotation on the shafts and are driven in rotation via gears 7 and 8 from a motor (not shown). A note fed through the system passes between the rims of rollers 5 and 6.

Figure 4:
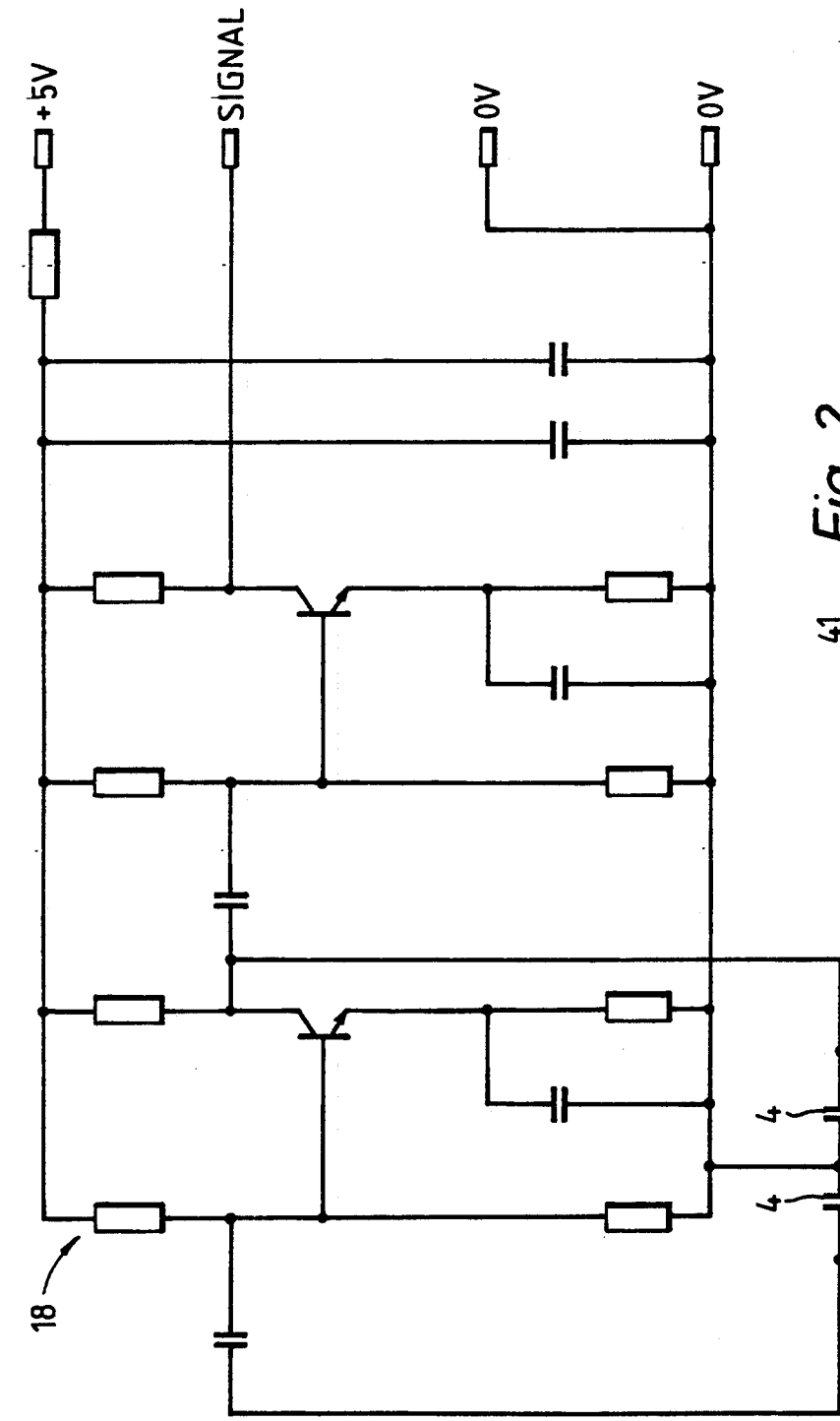
FIG. 4 shows an oscillator circuit for use in the block diagram of FIG. 3.
Figure 3:
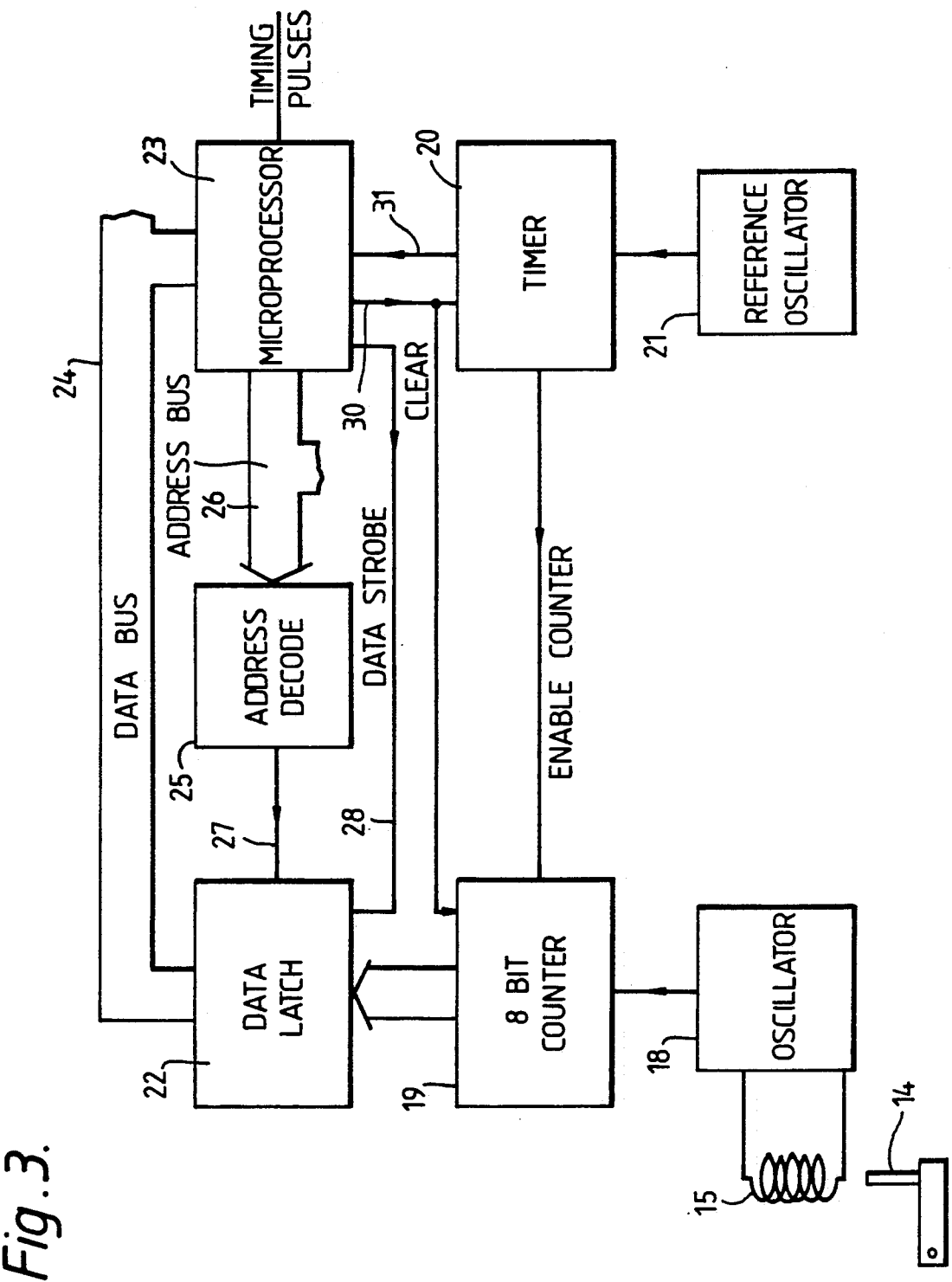
FIG. 3 is a block diagram of the electronic apparatus for processing the output of the sensor in FIG. 1.

Part of the surface of the roller 5 engages an arm 12 which is mounted on a pivot shaft 13 attached between the side plates. A ferrite core 14, cooperating with a flat coil 15, is mounted on the other end of the pivoted arm 12, i.e. remote from the pivot shaft 13. The arm 12 is urged against the roller 5 under spring action. The flat coil 15 is mounted on a printed circuit board 3 on which the processing circuitry shown in FIGS. 3 and 4 is also mounted. In one example, the flat coil 15 has an inside diameter of about 12 mm and six turns, three on each side of board 3. The ferrite core 14 in this case has a diameter of about 6 mm and a length of about 30 mm. Its degree of penetration, ie. the amount by which the core protrudes through the coil, is 3 mm±1.5 mm.

When a note passes between the rollers 5, 6, the rubber filled sensor roller 5 deflects causing pivotal movement of the arm 12. This causes relative movement between the ferrite rod 14 and the flat coil 15 due to the angular movement of the arm 12 about the pivot shaft 13. The movement of the ferrite core 14 through the flat coil 15 changes the inductance of the coil.

The passage of two superimposed notes between the rollers 5, 6 results in a greater degree of movement of the core than when a single note passes between the rollers 5, 6 and thus a different change in inductance of the coil.

Figure 2:
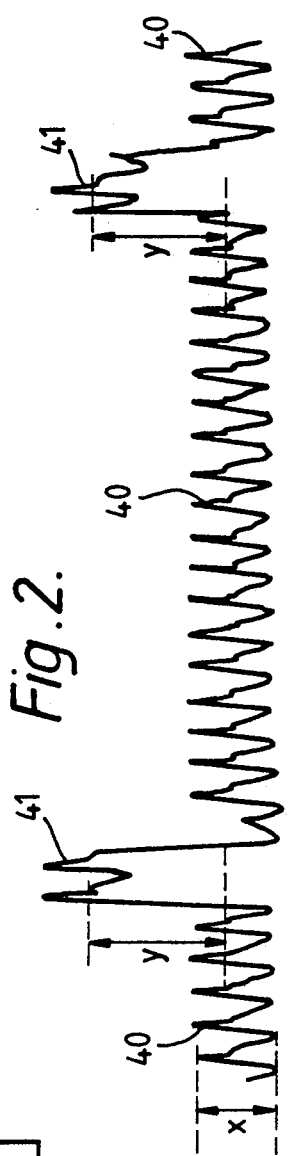
FIG. 2 is a typical waveform obtained using apparatus of the kind shown in FIG. 1.

FIG. 2 shows a typical waveform 40 obtained from such a sensor. The small-amplitude variations x indicate, in analog equivalent form, the variable frequency pattern produced by the sensor due to the eccentricity of the pinch rollers 5, 6. Thus, the periodic pattern corresponds to the composite profile of the pinch rollers in one revolution.

It will be seen from FIG. 2 that when a note passes between the pinch rollers the waveform pattern is offset by an amount y corresponding to the thickness of the note but the offset pattern 41 suffers little distortion.

The coil 15 (shown diagrammatically in FIG. 3) is connected to an oscillator circuit 18 which varies in frequency with the penetration of the core through the coil. An eight-bit counter 19 receives the oscillator output and counts the number of pulses present in a predetermined period or time "window". Thus, the count during such a period represents the penetration of the core 14 through the coil 15 and the relative deflection of the rollers. The duration of the predetermined period or time "window" during which the count is made is predetermined by a timer 20 supplied with pulses by a crystal-controlled reference oscillator 21

The count is fed to a data latch circuit 22 and to a data bus 24 to a microprocessor 23 responsible for monitoring the counts and detecting the presence of a sheet or sheets. As the data bus carries other data at other times, when the microprocessor requires data from the data latch circuit, it sends a suitable address signal over an address bus 26 to an address decode circuit 25 which signals the data latch circuit 22 over a line 27. The microprocessor 23 also supplies a data strobe signal over line 28 to the data latch circuit 22.

The circuit shown in FIG. 4 consists of an oscillator, the frequency of which depends upon the inductance of the coil 15, capacitors 4 (typically each of 1500 pF) and a buffer, and is of conventional design.

In the example described, the oscillator operates at approximately 6 MHz and the duration of the sampling period or time "window" is such that the count obtained is greater than eight bits. However, the high-order data bits (those in excess of eight) are ignored and only the changes in the lower-order bits are used in the signal processing algorithm. This increases the resolution which can be obtained.

The pinch rollers 5, 6 and a timing disc 31 (FIG. 1) are driven by the main transport for the notes, producing thirty six timing pulses per revolution of the pinch rollers. These timing pulses define thirty six sampling points in each revolution of the rollers. At each timing pulse, the microprocessor 23 (FIG. 3) supplies a "clear" signal over line 30 to clear the 8-bit counter 19 and the timer 20. The timer 20 then counts the pulses from oscillator 21 and the counter 19 counts the pulses from the oscillator 18. When the timer 20 overflows it stops the counter 19 and sends a "data ready" signal over line 31 to the microprocessor 23. The microprocessor then addresses the data latch circuit 22 and acquires the data reading, as described above.

To generate and store the eccentricity profile of the rollers prior to the arrival of a note the microprocessor samples the signal from the sensor at each of the thirty six sampling instants and retains each sample value in a memory location. To smooth out the effects of random noise on the sampled values, a further reading is taken for each sample point and the value in the memory is replaced by the average of the existing value in the memory and the new sample value for that point.

Figure 7:
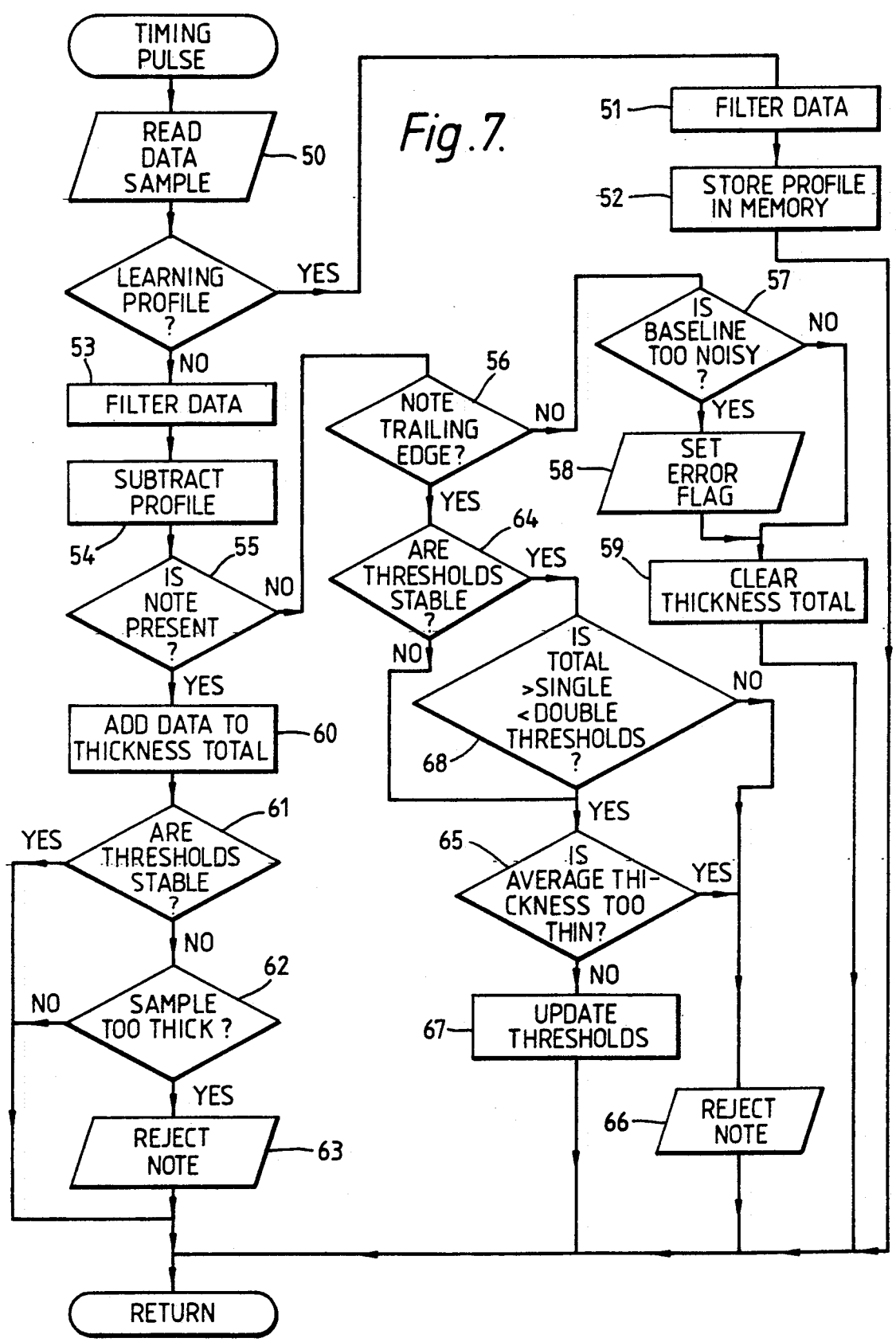

Operation of the apparatus is illustrated by the flow diagram in FIG. 7. On the occurrence of each timing pulse, a data sample or count is read (step 50) and if the apparatus is in the profile generating mode described above, the sample is filtered (step 51) and stored (step 52) as described.

If the apparatus is in its normal feed mode, the sample is filtered (step 53) and the corresponding eccentricity profile value is subtracted (step 54) to yield a difference value which is compared (step 55) with a first "note present" threshold set to about one half the value expected for a normal note thickness. In order to cope with noise variations, this comparison step 55 will generally compare three succeeding difference values with the note present threshold.

If the difference values do not satisfy this test then this could be indicative of the fact that the trailing edge of a note has just passed or that the apparatus is in an idle state with no note passing. This is determined in a step 56. If no note has just passed, then the difference value is compared with a TEST threshold (step 57). If the difference is greater than the TEST threshold this is indicative of the fact that the eccentricity profile value has been set too high and the apparatus will set an error flag (step 58) and cause the eccentricity profile to be relearned. In either event, a running thickness total is cleared (step 59) and operation returns to step 50.

During the passage of a note, successive difference values will be generated in step 54 and these are added to a running thickness total (step 60). The final value of this thickness total will vary in accordance with the thickness of the note which has passed and with its length. In other words the total will vary with the product of the note thickness and the note length. The apparatus operates to continually update the thresholds which are used in the decision process and initially these thresholds will vary from start-up default values to final stabilised values. Thus, while a note is present, a decision is made (step 61) as to whether the thresholds are stable and if they are not then instead of making use of the running thickness total, the microprocessor compares an instantaneous thickness value ie. a single difference value from step 54 with a double thickness threshold (step 62). If the difference value exceeds this threshold then the note is rejected (step 63). However, if the thresholds are stable or the note does not exceed the threshold then operation returns to step 50.

As soon as it is determined in step 55 that a note is not present and that in step 56 a trailing edge has just passed, a decision is again taken as to whether the thresholds are stable (step 64). Initially, the thresholds will not be stabilised and the running thickness total determined in step 60 is divided by the length of the note to generate an average thickness value which is then compared with a minimum thickness value in step 65. If the average thickness is less than the minimum threshold this could suggest a change in the type of note being fed or an incorrect threshold being used and in either case the note is rejected (step 56) and operation returns to step 50. If the average thickness exceeds the minimum threshold then all the thresholds used in the system are updated (step 67) using the latest acquired data and operation returns to step 50. In this case, a count of the number of notes passing is incremented.

Once the thresholds are stabilised, the microprocessor carries out a step 68 after step 64 in which the running thickness total is compared with single and double threshold values. Typically, the single threshold value corresponds to $\frac{2}{3}$ times the expected integrated thickness total for a single note and the double note threshold corresponds to 1.4 times the integrated thickness total expected for a single note. If the actual thickness total falls between these two thresholds then operation passes to step 65 which operates as before. Otherwise, the note is rejected (step 56).

Figure 5:
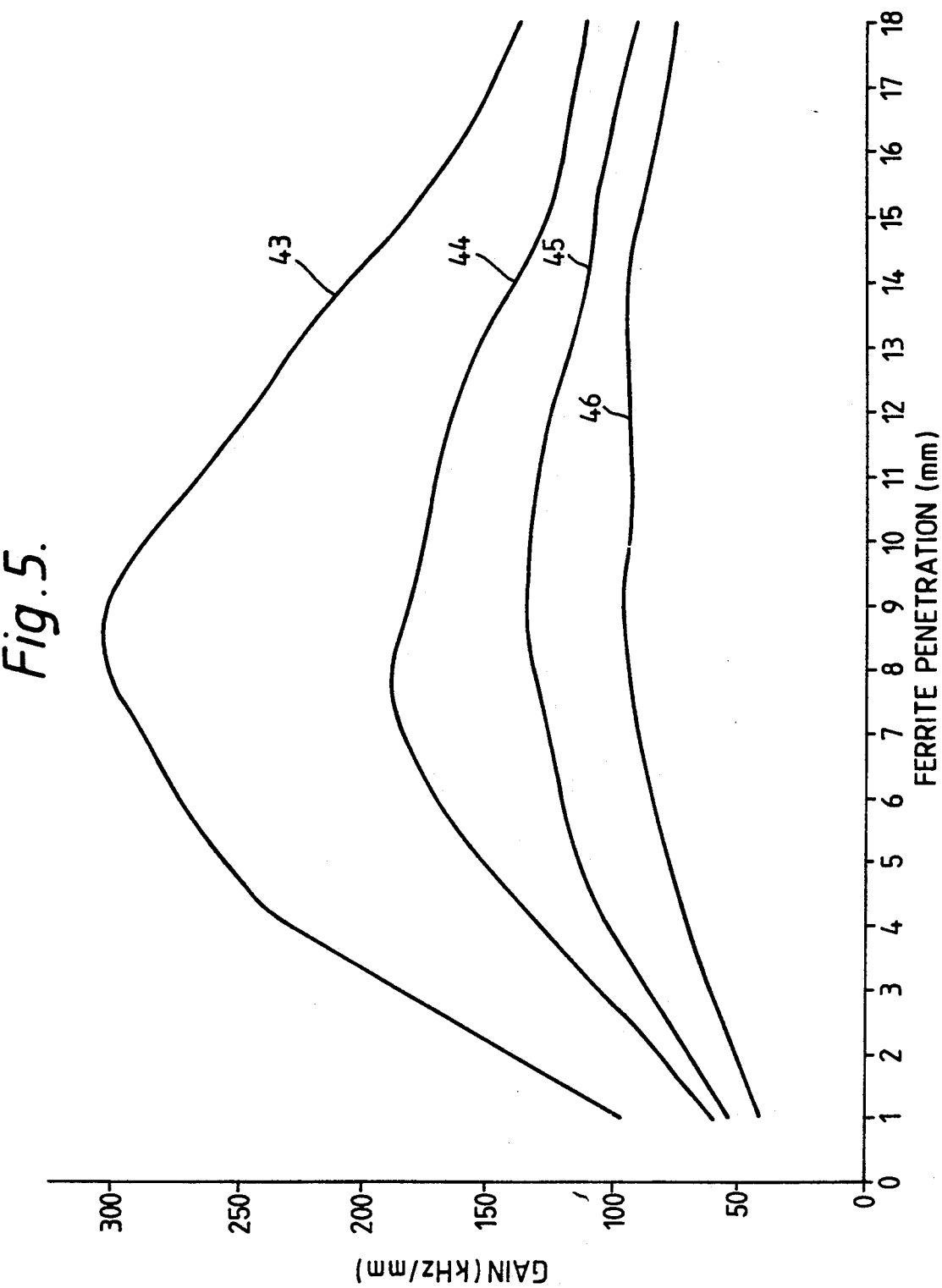
FIG. 5 illustrates graphically the variation in gain with core penetration for conventional solenoids.

FIG. 5 illustrates the results of tests carried out in which the flat coil 15 is replaced with a solenoid as in our earlier European Patent Application No. 85309261.7. In FIG. 5, curve 43 corresponds to a 10 mm diameter coil, curve 44 to a 12 mm diameter coil, curve 45 to a 14 mm diameter coil and curve 46 to a 16 mm diameter coil. As can be seen in FIG. 5, increasing the diameter of the coil increases linearity but significantly decreases the gain of the system. Linearity, or "operating range" is defined as the penetration range for which the gain does not vary by more than 10% of the nominal value. If a 14 mm diameter solenoid is chosen so as to be sufficient to give the required mechanical clearances, the capacitors 4 are reduced to 150 pF to compensate for the gain loss but the resulting system is found to be too insensitive. Making the capacitors 4 any smaller results in a high susceptibility to external stray capacitances.

Figure 6:
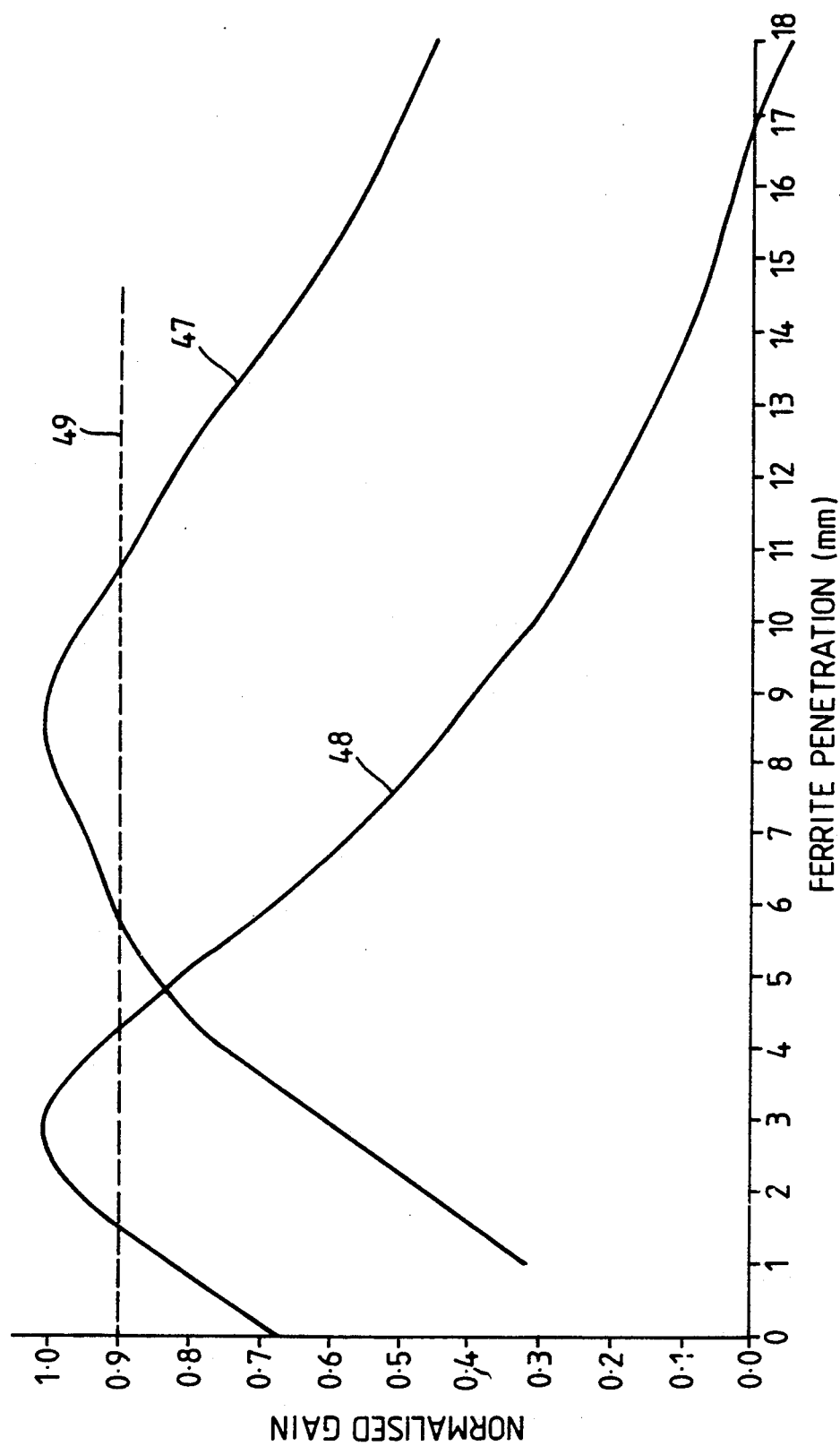
FIG. 6 illustrates graphically the variation in gain with core penetration for a 10 mm diameter coil and for a flat coil; and, FIG. 7 is a flow diagram illustrating operation of the apparatus.

We have found that replacing the known solenoid with a flat coil significantly increases the gain without substantially affecting linearity. This is apparent from FIG. 6 which compares the variation of gain with ferrite core penetration for a solenoid with a 10 mm internal diameter (curve 47) and a flat coil with a 12 mm internal diameter (curve 48). The broken line 49 in FIG. 6 represents 10% gain drop-off. As can be seen, for penetration distances in the order 1.5-4.0 mm there is little change in gain for the flat coil although there is a significant change in gain for the solenoid.

The flat coil offers the benefits of ease of manufacture and a higher reliability than the conventional solenoid.

I claim:

1. Apparatus for sensing the passage of sheets through a nip, said apparatus comprising:
    a pair of guide members whose surfaces define said nip, said guide members being movable in a cyclic manner to advance the sheets through said nip;
    sensing means for sensing the deflection of said guide members relative to one other, said sensing means including a signal generator providing a train of signals the frequency of which varies with the amount of relative deflection of said guide members, and a counter arranged to count said signals from said signal generation during an interval of predetermined length;

detecting means responsive to the output of said sensing means to establish the presence or absence of a sheet between said guide members as a function of a count supplied from said sensing means; and said sensing means including a substantially flat coil and a core so mounted that relative displacement of said guide members by the passage of a sheet causes relative movement between said core and said coil, and said coil being connected to said signal generator and effective for controlling said frequency of said signal generator in accordance with the degree of penetration of said core through said coil.

2. Apparatus for sensing the passage of sheets through a nip, comprising:

a pair of guide members whose surfaces define said nip, said guide members being movable in a cyclic manner to advance the sheets through said nip;

sensing means for sensing the deflection of one guide member relative to the other, said sensing means including a signal generator providing a train of signals the frequency of which varies with the amount of relative deflection of said guide members, and a counter arranged to count said signals from said signal generator in an interval of predetermined length;

monitoring means for monitoring the output of said sensing means and for storing counts representing relative deflections of said guide members in a cycle of movement of said guide members when no sheet is present;

and detecting means responsive to the output of said sensing means to establish the presence or absence of a sheet between said guide members, said detecting means being responsive to a subsequent count from said sensing means and to said stored counts for comparing, with a predetermined threshold, the difference between said subsequent count and a stored count for a corresponding position in said cycle of movement of said guide members, to establish the presence or absence of a sheet between the guide members; and, the sensing means including a substantially flat coil and a core so mounted that relative displacement of said guide members by the passage of a sheet causes relative movement of said core and coil, and said coil being connected to said signal generator and controlling said frequency of said signal generator in accordance with the degree of penetration of said core through said coil.

3. Apparatus in accordance with claim 2 in which the detecting means includes means defining a second and higher threshold, a difference which lies between said two thresholds indicating the presence of one sheet and a difference which exceeds said second and higher threshold indicating the presence of two or more sheets between said guide members.

4. Apparatus in accordance with claim 2, in which said guide members are rollers.

5. Apparatus in accordance with claim 4 in which one of said rollers is mounted on a fixed shaft and the other is mounted to permit its displacement relative to said shaft of said first roller.

6. Apparatus according to claim 1, further including a printed circuit board which carries said flat coil and other components of said detecting means.

7. Apparatus according to claim 6, wherein said sensing means comprises a pair of axially aligned flat coils which are mounted on opposite sides of said printed circuit board.

8. Apparatus according to claim 2, further including a printed circuit board which carries said flat coil and other components of said detecting means.

9. Apparatus according to claim 8, wherein said sensing means comprises a pair of axially aligned flat coils which are mounted on opposite sides of said printed circuit board.

* * * * *